(12) United States Patent
Varghese et al.

(10) Patent No.: US 11,614,608 B1
(45) Date of Patent: Mar. 28, 2023

(54) SYSTEM AND METHOD FOR EXTRACTING LIGHT USING MONOCHROMATIC ABERRATION-CORRECTED LENSES

(71) Applicant: The Boeing Company, Chicago, IL (US)

(72) Inventors: Sijo Varghese, Kerala (IN); Jeffrey H. Hunt, Thousand Oaks, CA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 17/649,199

(22) Filed: Jan. 28, 2022

(51) Int. Cl.
| | |
|---|---|
| *G02B 19/00* | (2006.01) |
| *G02B 27/00* | (2006.01) |
| *F21V 5/04* | (2006.01) |
| *B60Q 3/44* | (2017.01) |
| *B64D 47/02* | (2006.01) |
| *B64D 11/00* | (2006.01) |
| *F21W 106/00* | (2018.01) |
| *F21W 107/30* | (2018.01) |

(52) U.S. Cl.
CPC ........... *G02B 19/0047* (2013.01); *B60Q 3/44* (2017.02); *B64D 47/02* (2013.01); *F21V 5/04* (2013.01); *G02B 19/0028* (2013.01); *G02B 27/0025* (2013.01); *B64D 2011/0053* (2013.01); *F21W 2106/00* (2018.01); *F21W 2107/30* (2018.01)

(58) Field of Classification Search
CPC ....... F21V 5/007; F21V 5/04; F21W 2107/30; B64D 2011/0053; B60Q 3/44; G02B 19/0047; G02B 3/02; G02B 3/04; G02B 3/08; B02B 3/06
See application file for complete search history.

(56) References Cited

U.S. PATENT DOCUMENTS

| | | | | |
|---|---|---|---|---|
| 5,442,252 A | * | 8/1995 | Golz | G02B 3/02 362/309 |
| 2011/0157557 A1 | | 6/2011 | Vogel et al. | |
| 2015/0062956 A1 | | 3/2015 | Genier | |
| 2022/0309980 A1 | | 9/2022 | Wang et al. | |

FOREIGN PATENT DOCUMENTS

| | | |
|---|---|---|
| KR | 20130077057 A | 7/2013 |
| KR | 20150110933 A | 10/2015 |
| WO | 2008062929 A1 | 5/2008 |

OTHER PUBLICATIONS

Messer, A'ndrea Elyse, "Saving LED Light Bulbs", Futurity, Feb. 20, 2019, Penn State, 20 pages. URL: https://www.osapublishing.org/josab/fulltext.cfm?uri=josab-36-10-2810&id=418804, retrieved on Jan. 25, 2022.

(Continued)

*Primary Examiner* — Robert J May
(74) *Attorney, Agent, or Firm* — MH2 Technology Law Group LLP

(57) ABSTRACT

An apparatus for concentrating light from a light source includes a plurality of lenses that are substantially aligned with one another. Each lens includes a light-receiving end configured to receive the light from the light source and a light-transmitting end configured to transmit the light from the lens to a target. The light-receiving ends are aspherical.

20 Claims, 3 Drawing Sheets

(56) References Cited

OTHER PUBLICATIONS

Bay et al., "Improved light extraction in the bioluminescent lantern of a Photuris firefly (*ampyridae*)," Optics Express 21(1):7:764-80. URL: https://www.chemistryworld.com/news/fireflies-inspire-low-cost-led-lighting-/5573.article, retrieved on Jan. 25, 2022.

Kim et al., "Biologically inspired LED lens from cuticular nanostructures of firefly lantern," Proceedings of the National Academy of Sciences of the United States of America (PNAS), Nov. 13, 2012, pp. 18674-18678, vol. 109, No. 46. URL: https://cen.acs.org/articles/94/web/2016/04/Firefly-inspires-brighter-LEDs.html, retrieved on Jan. 25, 2022.

Patel, "Firefly-inspired LEDs Shine Bright On Less Energy," Daily Science, Mar. 7, 2019, Anthropocene Magazine, 8 pages. URL: https://www.osa-opn.org/home/newsroom/2019/february/fireflies_inspire_more_efficient_leds/, retrieved on Jan. 25, 2022.

Green et al., "How fireflies inspired energy-efficient lights," BBC News, Science & Environment, May 7, 2019, 1 page. URL: https://www.bbc.com/news/av/science-environment-48152165, retrieved on Jan. 25, 2022.

Michaud, "Fireflies Inspire More Efficient LEDs," Optics & Photonics News, Feb. 27, 2019, 3 pages. URL: https://www.anthropocenemagazine.org/2019/03/firefly-inspired-leds-shine-bright-on-less-energy/, retrieved on Jan. 25, 2022.

Bourzac, "Firefly inspires brighter LEDs," Biological Chemistry, Apr. 19, 2016, 3 pages. URL: https://www.pnas.org/content/109/46/18674, retrieved on Jan. 25, 2022.

Urquhart, "Fireflies inspire low-cost LED lighting" Chemistry World, Oct. 28, 2012, 4 pages. URL: Https://www.researchgate.net/publication/235415464_Improved_light_extraction_in_the_bioluminescent_lantern_of_a_Photuris_firefly_Lampyridae, retrieved on Jan. 25, 2022.

Liu et al., "Wide-angle Moiré metalens with continuous zooming," Journal of the Optical Society of America B, 2019, vol. 36, Issue 10, pp. 2810-2816. URL: https://www.futurity.org/light-bulbs-leds-fireflies-1988062/, retrieved on Jan. 25, 2022.

\* cited by examiner

SYSTEM AND METHOD FOR EXTRACTING LIGHT USING MONOCHROMATIC ABERRATION-CORRECTED LENSES

FIELD

The subject matter described herein generally relates to increasing light extraction efficiency. More particularly, the subject matter disclosed herein relates to increasing light extraction efficiency from a light emitting diode (LED) using monochromatic aberration-corrected lenses.

BACKGROUND

Conventional LEDs are about 50% efficient. The other 50% is lost as trapped light due to total internal reflection (TIR). Total internal reflection is the optical phenomenon in which waves arriving at the interface (boundary) from one medium to another (e.g., from water to air) are not refracted into the second ("external") medium, but completely reflected back into the first ("internal") medium. It occurs when the second medium has a higher wave speed (lower refractive index) than the first, and the waves are incident at a sufficiently oblique angle on the interface.

One existing solution to increase the light extraction from the LED, and thus increase the efficiency of the LED, is to form micro-structures in the shape of asymmetric cones, somewhat akin to the scales found on the abdomen of a firefly. However, the light that can escape through the micro-structures can still be diverted in an undesired direction after exiting the LED because the refraction may cause the light to project at an obtuse angle relative to the desired orthogonal direction.

SUMMARY

An apparatus for concentrating light from a light source is disclosed. The apparatus includes a plurality of lenses that are substantially aligned with one another. Each lens includes a light-receiving end configured to receive the light from the light source. The light-receiving end is aspherical. Each lens also includes a light-transmitting end configured to transmit the light from the lens to a target.

In another implementation, the apparatus includes a plurality of lenses that are side-by-side with one another. The light source is an overhead passenger light source in an aircraft. Each lens includes a monochromatic aberration-corrected lenses, a metalens, or a combination thereof. Each lens includes a light-receiving end that is configured to receive the light from the light source. Each lens includes a light-transmitting end that is configured to transmit toward a target. The light-receiving end of each lens is located closer to the light source than the light-transmitting end. The light-receiving ends are aspherical. The light-transmitting ends are convex. The light-receiving ends protrude outward more than the light-transmitting ends. A radiant energy of the apparatus is from about 2.2 to about 3.0. An emissivity of the apparatus is from about 75% to about 99%.

A method for concentrating light from a light source is also disclosed. The method includes positioning a light-concentrating apparatus between the light source and a target. The light-concentrating apparatus includes a plurality of lenses that are substantially aligned with one another. Each lens includes a light-receiving end and a light-transmitting end. The light-receiving end is configured to receive the light from the light source. The light-transmitting end is configured to transmit the light from the lens toward the target. The light-receiving ends are aspherical. The method also includes causing the light to be transmitted from the light source to the light-receiving ends of the lenses.

DRAWINGS

The above and/or other aspects and advantages will become more apparent and more readily appreciated from the following detailed description of examples, taken in conjunction with the accompanying drawings, in which.

DETAILED DESCRIPTION

Figure 1:
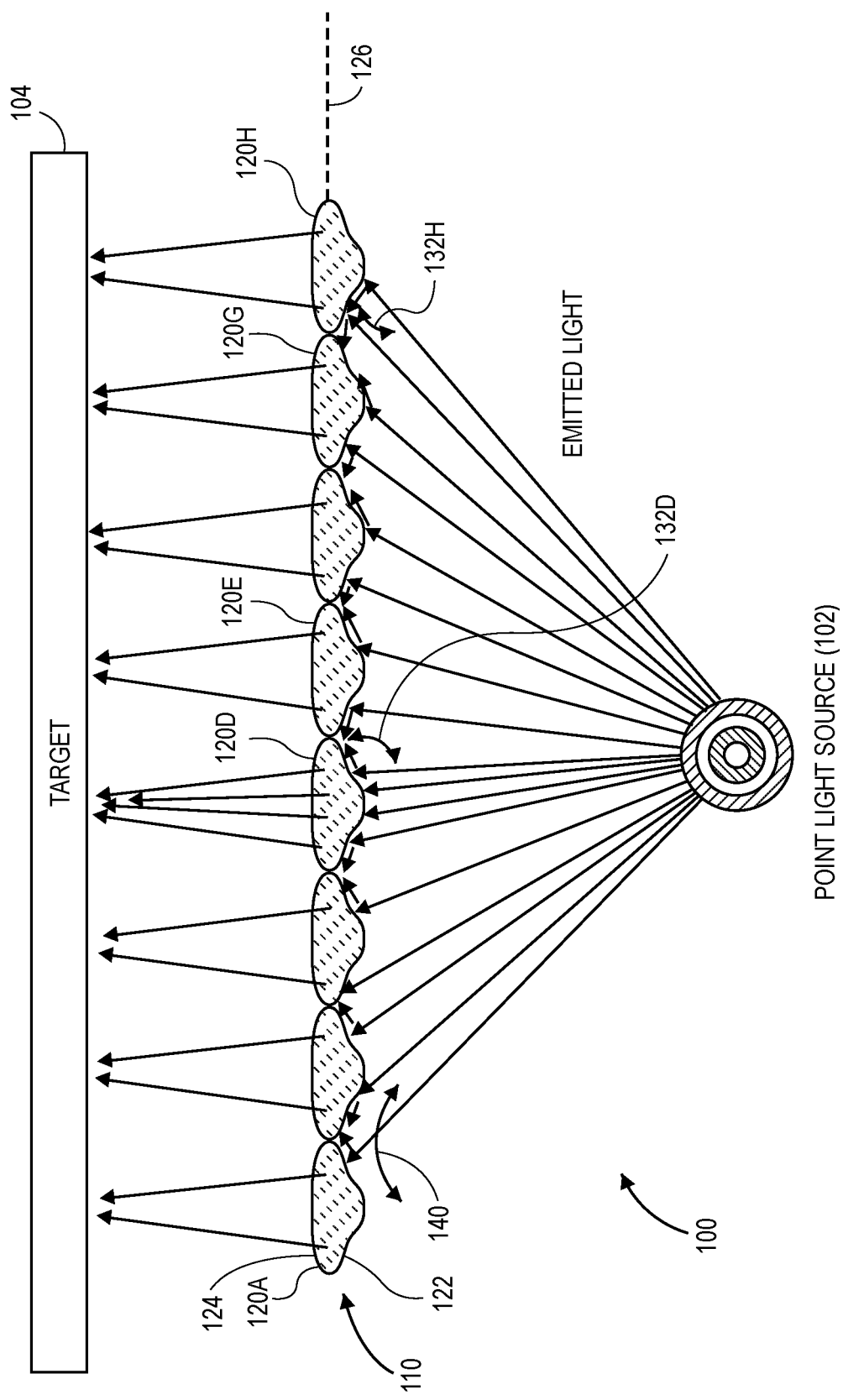
FIG. 1 illustrates a side view of a system for concentrating light, according to one or more implementations.

Exemplary aspects will now be described more fully with reference to the accompanying drawings. Examples of the disclosure, however, can be embodied in many different forms and should not be construed as being limited to the examples set forth herein. Rather, these examples are provided so that this disclosure will be thorough and complete, and will fully convey the scope to those skilled in the art. In the drawings, some details may be simplified and/or may be drawn to facilitate understanding rather than to maintain strict structural accuracy, detail, and/or scale.

It will be understood that when an element is referred to as being "on," "associated with," "connected to," "electrically connected to," or "coupled to" to another component, it may be directly on, associated with, connected to, electrically connected to, or coupled to the other component or intervening components may be present. In contrast, when a component is referred to as being "directly on," "directly associated with," "directly connected to," "directly electrically connected to," or "directly coupled to" another component, there are no intervening components present. As used herein, the term "and/or" includes any and all combinations of one or more of the associated listed items.

It will be understood that although the terms first, second, etc., may be used herein to describe various elements, components, and/or directions, these elements, components, and/or directions should not be limited by these terms. These terms are only used to distinguish one element, component, and/or direction from another element, component, and/or direction. For example, a first element, component, or direction could be termed a second element, component, or direction without departing from the teachings of examples.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation(s) depicted in the figures.

FIG. 1 illustrates a side view of another system 100 for concentrating light, according to one or more implementations. The system 100 may include the light source 102, the target 104, and a light-concentrating apparatus 110. The system 100 may be part of a vehicle (e.g., FIG. 3). For example, the system 100 may be part of an overhead aircraft lighting system (e.g., 100 in FIG. 3).

The apparatus 110 is configured to be positioned at least partially between the light source 102 and the target 104. As described in greater detail below, the apparatus 110 is configured to concentrate the light from the light source 102 to the target 104, thereby increasing the light extraction efficiency. For example, the light extraction efficiency may be greater than 70%, greater than 80%, greater than 90%, or greater than 95%. The apparatus 110 may also or instead achieve a narrower or wider light dispersion effect, which may be controllable based upon the lighting requirement.

The apparatus 110 may include one or more lenses (eight are shown: 120A-120H). In one implementation, the lenses 120A-120H may be or include monochromatic aberration-corrected lenses. In another implementation, the lenses 120A-120H may also or instead be or include metalenses (e.g., wide-angle Moire metalens structures). The lenses 120A-120H may be substantially aligned with one another (e.g., side-by-side). Each lens 120A-120H includes a first (e.g., light-receiving) end 122 that is configured to receive the light from the light source 102. Each lens 120A-120H also includes a second (e.g., light-transmitting) end 124 that is configured to transmit the light to the target 104. The light-receiving ends 122 are located closer to the light source 102 than the light-transmitting ends 124.

At least some of the light rays emitted from the source 102 may reach the lenses 120A-120H at oblique incident angles. The lenses 120A-120H may then cause the light rays to converge to a designated focal point on the target 104. This may increase the amount of light that is extracted from the light source 102. This may also reduce the overall temperature of the system 100, which may increase the life of the system 100.

The light-receiving end 122 of each lens 120A-120H may have a variable profile such that it extends different distances from a plane 126 that extends through the lens 120A-120H and is parallel to the target 104. In other words, the light-receiving ends 122 may be asymmetric with respect to the plane 126. For example, the light-receiving ends 122 may be at least partially aspherical (i.e., part of an aspheric lens). This may prevent the light from contacting the lenses 120A-120H at a critical angle, which may reduce the likelihood of total internal reflection. In addition, aspherical profile may cause the light entering the lenses 120A-120H to experience an outward propagation. The light-transmitting end 124 of each lens 120A-120H may be convex (curve outward toward the target 104). The light-receiving ends 122 may protrude outward farther than the light-transmitting ends 124.

Due to the light-receiving end 122 of each lens 120A-120H having an aspherical profile, each two adjacent light-receiving ends 122 form a substantially concave profile 140. In other words, a plurality of (e.g., seven) concave profiles 140 may be present. The substantially concave profile 140 of a first lens 120D is configured to cause at least a portion of the light from the light source 102 to reflect off of the lens 120D at an obtuse angle 132D and to enter the same lens 120D or an adjacent lens 120E at an angle of incidence that is less than a critical angle. The substantially concave profile 140 of a second lens 120H is configured to cause at least a portion of the light from the light source 102 to reflect off of the lens 120H at an acute angle 132H and to enter the lens 120H or an adjacent lens 120G at an angle of incidence that is less than a critical angle. The first lens 120D may be located closer to the light source 102 than the second lens 120H. This arrangement may concentrate the light from the light source 102 to the target 104 thereby increasing (e.g., maximizing) the light extraction efficiency.

Figure 2:
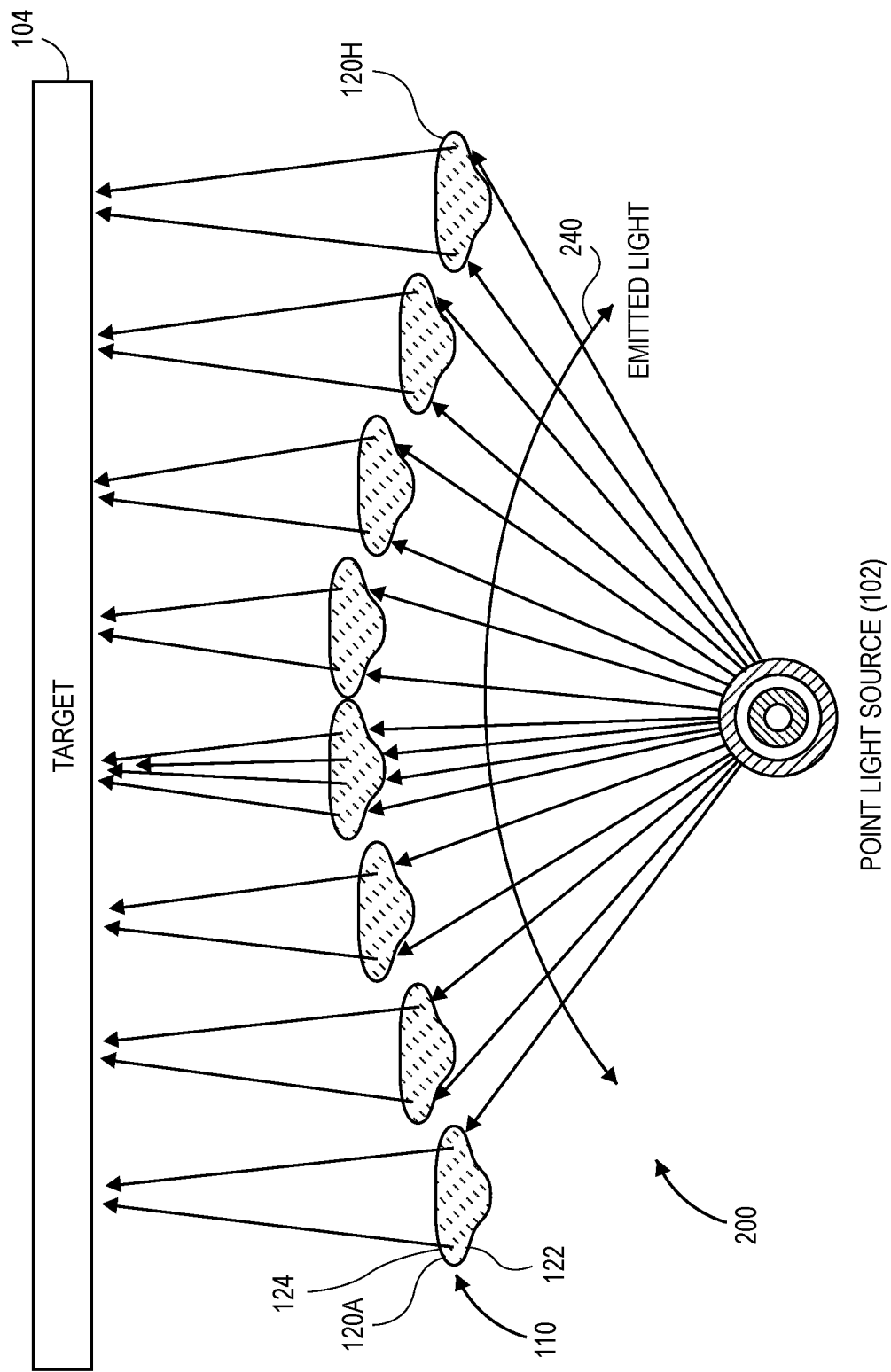
FIG. 2 illustrates a side view of the system with a light-receiving end of a light-concentrating apparatus in a substantially concave shape, according to one or more implementations.

FIG. 2 illustrates a side view of the system 100 with a light-receiving ends 122 of the light-concentrating apparatus 110 in a substantially concave shape 240, according to one or more implementations. As mentioned above with respect to FIG. 1, the light-receiving ends 122 of two adjacent lenses 120A-120H may form a smaller substantially concave profile 140. Seven smaller substantially concave profiles 140 may be seen in FIG. 1. In FIG. 2, the light-receiving ends 122 of the lenses 120A-120H may also form a larger substantially concave profile 240. Thus, a plurality of (e.g., seven) smaller substantially concave profiles 140 may be present within the larger substantially concave profile 240. This may further concentrate the light from the light source 102 to the target 104 thereby increasing (e.g., maximizing) the light extraction efficiency. It may also or instead achieve a wider light dispersion effect by clustering the lenses 120A-120H, making this design customizable based on the lighting requirement for the particular application. In another implementation, the larger substantially concave profile 240 may be present, and the smaller substantially concave profiles 140 may be omitted such that the larger substantially concave profile 240 is smoother than that shown in FIG. 2. The profiles may also or instead be substantially rectangular, circular, hemispherical, or ovular.

In one implementation, the sustainability and/or life improvement of the apparatus 110 may be better than that of conventional apparatuses by delaying obsolescence. First, the apparatus 110 may consume less energy to generate nominal lumen which otherwise conventionally may require higher electrical energy. This contributes to sustainability. Second, the apparatus 110 may reduce the overall heating of the light source 102 by increasing the light extraction therefrom. This contributes to life improvement.

The improvements to sustainability and/or life improvement may be achieved by:

$$E = \varepsilon' \sigma T^4 \qquad \text{(Equation 1)}$$

where E is the radiant heat energy emitted from a unit area in one second. The apparatus 110 may increase this value (e.g., cause this value to be greater than in conventional apparatuses). In one implementation, the radiant heat energy E for the system 100 (e.g., apparatus 110) may be from about 2.2 to about 3.0, about 2.4 to about 3.0, about 2.6 to about 3.0, or about 2.8 to about 3.0, whereas the radiant heat energy E for conventional apparatuses is about 2.062. This means that the apparatus 110 may radiate more heat energy outward, which decreases the overall temperature of the light source 102. The variable $\varepsilon'$ is emissivity. This value may be from about 75% to about 99%, about 80% to about 95%, or about 90% to about 95% compared to about 70% for conventional apparatuses. The variable $\sigma$ is the Boltzman constant (i.e., $5.670374419 \times 10^{-8}$ W/m$^2$ per K$^4$. The variable T is the absolute temperature, which may be the temperature at the light source 102 (e.g., LED bulb) heat sink. The temperature T may be from about 333.15 K to about 373.15 K.

Figure 3:
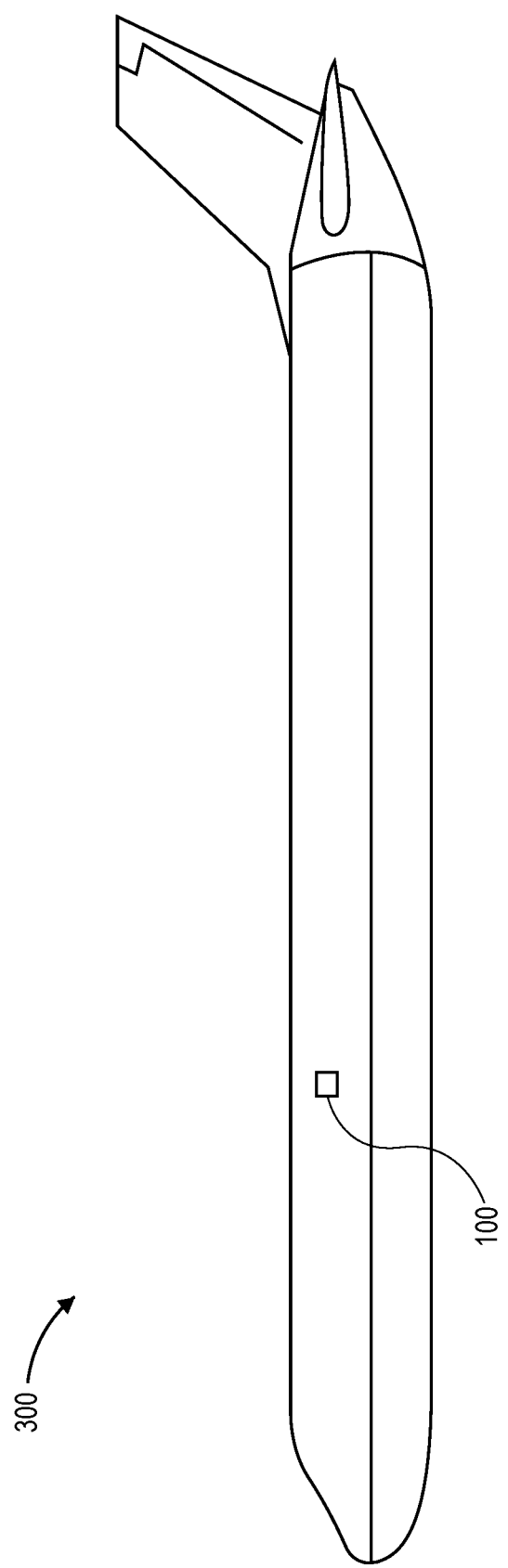
FIG. 3 illustrates a side view of a vehicle, according to one or more implementations.

FIG. 3 illustrates a side view of a vehicle 300, according to one or more implementations. As shown, the vehicle 300 may be an aircraft (e.g., an airplane). In other implementations, the vehicle 300 may be or include car, a bus, a train, boat, a helicopter, an unmanned aerial vehicle (e.g., a drone), a satellite, a spacecraft, or the like. The system 100 may be on or in the vehicle 300. For example, the system 100 may be part of an overhead aircraft lighting system in the cabin of the vehicle 300.

While the foregoing disclosure has been described in some detail by way of illustration and example for purposes of clarity and understanding, it will be clear to one of ordinary skill in the art from a reading of this disclosure that various changes in form and detail can be made without departing from the true scope of the disclosure and may be practiced within the scope of the appended claims. For example, all the methods, systems, and/or component parts or other aspects thereof can be used in various combinations. All patents, patent applications, websites, other publications or documents, and the like cited herein are incorporated by reference in their entirety for all purposes to the same extent as if each individual item were specifically and individually indicated to be so incorporated by reference.

What is claimed is:

1. An apparatus for concentrating light from a light source, the apparatus comprising:
    a plurality of lenses that are substantially aligned with one another, wherein each lens comprises:
        a light-receiving end configured to receive the light from the light source, wherein the light-receiving end is aspherical; and
        a light-transmitting end configured to transmit the light from the lens to a target, wherein the light-receiving ends of two adjacent lenses form a substantially concave profile, and wherein the substantially concave profile of a first pair of adjacent lenses is configured to cause at least a portion of the light from the light source to reflect off of one of the lenses in the first pair at an obtuse angle and to enter the other lens in the first pair at an angle of incidence that is less than a critical angle.

2. The apparatus of claim 1, wherein the light-receiving end of each lens is located closer to the light source than the light-transmitting end.

3. The apparatus of claim 1, wherein the lenses comprise monochromatic aberration-corrected lenses, metalenses, or a combination thereof.

4. The apparatus of claim 1, wherein the light-transmitting end is convex.

5. The apparatus of claim 4, wherein the light-receiving end protrudes outward more than the light-transmitting end.

6. The apparatus of claim 1, wherein the substantially concave profile of a second pair of adjacent lenses is configured to cause at least a portion of the light from the light source to reflect off of one of the lenses in the second pair at an acute angle and to enter the other lens in the second pair at an angle of incidence that is less than a critical angle.

7. The apparatus of claim 6, wherein the first pair is closer to the light source than the second pair.

8. The apparatus of claim 6, wherein the light-receiving ends of the lenses form a larger substantially concave profile, and wherein the light-receiving ends of the lenses in the first and second pairs form two smaller substantially concave profiles within the larger substantially concave profile.

9. The apparatus of claim 1, wherein the light-receiving end comprises two concave portions and a convex portion, wherein the convex portion is positioned between the two concave portions.

10. The apparatus of claim 1, wherein each of the light-transmitting ends is convex such that a light-transmitting surface of the apparatus, which comprises the light-transmitting ends, is not smooth.

11. The apparatus of claim 1, wherein the lenses are each substantially the same size.

12. An apparatus for concentrating light from a light source, the apparatus comprising:
    a plurality of lenses that are side-by-side with one another, wherein:
        the light source comprises an overhead passenger light source in an aircraft;
        each lens comprises a monochromatic aberration-corrected lenses, a metalens, or a combination thereof;
        each lens comprises a light-receiving end that is configured to receive the light from the light source;
        each lens comprises a light-transmitting end that is configured to transmit toward a target;
        the light-receiving end of each lens is located closer to the light source than the light-transmitting end;
        the light-receiving ends are aspherical;
        the light-transmitting ends are convex;
        the light-receiving ends protrude outward more than the light-transmitting ends;
        a radiant energy of the apparatus is from about 2.2 to about 3.0; and
        an emissivity of the apparatus is from about 75% to about 99%.

13. The apparatus of claim 12, wherein the light-receiving ends of two adjacent lenses form a substantially concave profile.

14. The apparatus of claim 13, wherein the substantially concave profile of a first pair of adjacent lenses is configured to cause at least a portion of the light from the light source to reflect off of one of the lenses in the first pair at an obtuse angle and to enter the other lens in the first pair at an angle of incidence that is less than a critical angle.

15. The apparatus of claim 14, wherein the substantially concave profile of a second pair of adjacent lenses is configured to cause at least a portion of the light from the light source to reflect off of one of the lenses in the second pair at an acute angle and to enter the other lens in the second pair at an angle of incidence that is less than a critical angle.

16. The apparatus of claim 15, wherein the light-receiving ends of the lenses form a larger substantially concave profile, and wherein the light-receiving ends of the lenses in the first and second pairs form two smaller substantially concave profiles within the larger substantially concave profile.

17. A method for concentrating light from a light source, the method comprising:
    positioning a light-concentrating apparatus between the light source and a target, wherein the light-concentrating apparatus comprises a plurality of lenses that are substantially aligned with one another, wherein each lens comprises a light-receiving end and a light-transmitting end, wherein the light-receiving end is configured to receive the light from the light source, wherein the light-receiving ends of two adjacent lenses form a substantially concave profile, wherein the substantially concave profile of a first pair of adjacent lenses is configured to cause at least a portion of the light from the light source to reflect off of one of the lenses in the first pair at an obtuse angle and to enter the other lens in the first pair at an angle of incidence that is less than a critical angle, wherein the light-transmitting end is configured to transmit the light from the lens toward the target, and wherein the light-receiving ends are aspherical; and
    causing the light to be transmitted from the light source to the light-receiving ends of the lenses.

18. The method of claim 17, wherein the lenses comprise monochromatic aberration-corrected lenses, metalenses, or a combination thereof, and wherein the light-transmitting ends are also concave but protrude outward less than the light-receiving ends.

19. The method of claim 17, further comprising moving one of the two adjacent lenses to modify the substantially concave profile.

20. The method of claim 17, further comprising moving the lenses to cause the light-receiving ends to form a larger substantially concave profile with a plurality of smaller substantially concave profiles therein.

* * * * *